United States Patent
Lee et al.

(10) Patent No.: US 10,904,745 B2
(45) Date of Patent: Jan. 26, 2021

(54) METHOD FOR PLURALITY OF PROCESSING TIME OR PLURALITY OF TRANSMISSION TIME INTERVALS IN WIRELESS COMMUNICATION SYSTEM, AND APPARATUS THEREFOR

(71) Applicant: LG Electronics Inc., Seoul (KR)

(72) Inventors: Hyunho Lee, Seoul (KR); Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/369,236

(22) Filed: Mar. 29, 2019

(65) Prior Publication Data
US 2019/0230498 A1 Jul. 25, 2019

Related U.S. Application Data

(63) Continuation of application No. PCT/KR2017/010392, filed on Sep. 21, 2017.
(Continued)

(51) Int. Cl.
*H04W 8/24* (2009.01)
*H04W 72/04* (2009.01)
(Continued)

(52) U.S. Cl.
CPC .............. *H04W 8/24* (2013.01); *H04L 1/18* (2013.01); *H04L 1/1819* (2013.01);
(Continued)

(58) Field of Classification Search
None
See application file for complete search history.

(56) References Cited

U.S. PATENT DOCUMENTS

2010/0267394 A1* 10/2010 Wu .................. H04W 24/10
455/450
2015/0103782 A1 4/2015 Xu et al.
(Continued)

FOREIGN PATENT DOCUMENTS

EP 2816858 12/2014
WO WO2015142278 9/2015
(Continued)

OTHER PUBLICATIONS

PCT International Search Report and Written Opinion in International Application No. PCT/KR2017/010392, dated Dec. 15, 20107, 17 pages (with English translation).
(Continued)

*Primary Examiner* — Nicholas Sloms
(74) *Attorney, Agent, or Firm* — Fish & Richardson P.C.

(57) ABSTRACT

A method by which a terminal supports a carrier aggregation and a short processing time in a wireless communication system, according to one embodiment of the present disclosure, comprises the steps of: reporting, to a base station, whether a terminal can support a short processing time when the carrier aggregation is configured; determining the processing time to be used by the terminal when a cross carrier aggregation is configured in the terminal; and performing an uplink transmission operation according to the determined processing time.

9 Claims, 6 Drawing Sheets

Related U.S. Application Data

(60) Provisional application No. 62/535,948, filed on Jul. 23, 2017, provisional application No. 62/491,382, filed on Apr. 28, 2017, provisional application No. 62/432,690, filed on Dec. 11, 2016, provisional application No. 62/423,157, filed on Nov. 16, 2016, provisional application No. 62/401,960, filed on Sep. 30, 2016, provisional application No. 62/401,850, filed on Sep. 29, 2016.

(51) Int. Cl.
    *H04L 1/18* (2006.01)
    *H04L 5/00* (2006.01)
    *H04W 72/14* (2009.01)
    *H04W 80/08* (2009.01)

(52) U.S. Cl.
    CPC .......... *H04L 5/0055* (2013.01); *H04L 5/0082* (2013.01); *H04W 72/04* (2013.01); *H04W 72/042* (2013.01); *H04W 72/0453* (2013.01); *H04W 72/14* (2013.01); *H04W 80/08* (2013.01); *H04L 5/0007* (2013.01)

(56) References Cited

U.S. PATENT DOCUMENTS

| | | | |
|---|---|---|---|
| 2017/0111923 A1* | 4/2017 | Nogami | H04W 72/1263 |
| 2018/0042015 A1* | 2/2018 | Yin | H04W 72/0446 |
| 2018/0076942 A1* | 3/2018 | Nory | H04L 5/0055 |
| 2019/0081722 A1* | 3/2019 | Takeda | H04B 1/713 |
| 2019/0191429 A1* | 6/2019 | Stern-Berkowitz | H04W 56/0045 |

FOREIGN PATENT DOCUMENTS

| | | |
|---|---|---|
| WO | WO2016159730 | 10/2016 |
| WO | WO2016133106 | 11/2017 |

OTHER PUBLICATIONS

Huawei, HiSilicon, "Discussion on CA issues for shortened TTI operation," R1-167189, 3GPP TSG RAN WG1 Meeting #86, Gothenburg, Sweden, Aug. 22-26, 2016, 4 pages.
OPPO, "Discussion of the UE processing time on the support of multiple numerologies and frame structures," R1-166615, 3GPP TSG RAN WG1 Meeting #86, Gothenburg, Sweden, Aug. 22-26, 2016, 2 pages.
Qualcomm Incorporated, "Shortened Processing Time for Downlink 1ms TTI," R1-166307, 3GPP TSG RAN WG1 #86, Gothenburg, Sweden, Aug. 22-26, 2016, 5 pages.
LG Electronics, "Consideration on support of CA operation for NR," R1-166923, 3GPP TSG RAN WG1 Meeting #86, Gothenburg, Sweden, Aug. 22-26, 2016, 3 pages.
Japanese Office Action in Japanese Application No. 2019-517359, dated Apr. 7, 2020, 5 pages (with English translation).
LG Electronics, "Discussion on CA operations for latency reduction," R1-1609218, 3GPP TSG RAN WG1 Meeting #86bis, Lisbon, Portugal, dated Oct. 10-14, 2016, 2 pages, XP051149264.
LG Electronics, "Discussion on configuration for shortened processing time in 1ms TTI," R1-1707533, 3GPP TSG RAN WG1 Meeting #89, Hangzhou, China, dated May 15-19, 2017, 3 pages.
Nokia, Nokia Shanghai Bell, "sTTI UE capability and configurability for carrier aggregation," R1-1712945, 3GPP TSG-RAN WG1 Meeting #90, Prague, Czech Republic, dated Aug. 21-25, 2017, 3 pages, XP051315755.
Partial Supplementary European Search Report in European Application No. 17856652.7, dated Apr. 15, 2020, 22 pages.
Extended European Search Report in European Application No. 17856652.7, dated Jun. 24, 2020, 24 pages.

* cited by examiner

METHOD FOR PLURALITY OF PROCESSING TIME OR PLURALITY OF TRANSMISSION TIME INTERVALS IN WIRELESS COMMUNICATION SYSTEM, AND APPARATUS THEREFOR

CROSS-REFERENCE TO RELATED APPLICATIONS

This application is a continuation of International Application No. PCT/KR2017/010392, filed on Sep. 21, 2017, which claims the benefit of U.S. Provisional Application No. 62/535,948, filed on Jul. 23, 2017, U.S. Provisional Application No. 62/491,382, filed on Apr. 28, 2017, U.S. Provisional Application No. 62/432,690, filed on Dec. 11, 2016, U.S. Provisional Application No. 62/423,157, filed on Nov. 16, 2016, U.S. Provisional Application No. 62/401,960, filed on Sep. 30, 2016, and U.S. Provisional Application No. 62/401,850, filed on Sep. 29, 2016. The disclosures of the prior applications are incorporated by reference in their entirety.

TECHNICAL FIELD

The present disclosure relates to a wireless communication system, and more particularly, to a method and apparatus for a plurality of processing times or a plurality of transmission time intervals (TTIs).

BACKGROUND ART

The latency of packet data is one of important performance metrics. To reduce the latency of packet data and provide faster Internet access to an ender user is one of challenging issues in designing the next-generation mobile communication system called new radio access technology (RAT) as well as long term evolution (LTE).

The present disclosure is intended to deal with uplink transmission such as transmission of a hybrid automatic repeat request (HARD) feedback or uplink data in a wireless communication system supporting latency reduction.

DISCLOSURE

Technical Problem

The present disclosure relates to capability reporting of a user equipment (UE) having a plurality of processing times in carrier aggregation (CA), a UE operation based on CA and the plurality of processing times, and a UE operation for supporting a short transmission time interval (TTI) or a plurality of TTIs in CA.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of supporting carrier aggregation and a shortened processing time in a wireless communication system, performed by a user equipment (UE) may include if carrier aggregation is configured for the UE, reporting to a base station (BS) whether the UE supports the shortened processing time, if cross carrier aggregation is configured for the UE, determining a processing time to be used for the UE, and performing an uplink transmission operation according to the determined processing time.

Alternatively or additionally, the report of whether the shortened processing time is supported may include information indicating whether the shortened processing time is supported for each number of carriers used for the carrier aggregation or for each group of numbers of carriers used for the carrier aggregation.

Alternatively or additionally, the report of whether the shortened processing time is supported may be provided on a band basis or on a band combination basis.

Alternatively or additionally, the report of whether the shortened processing time is supported may include information about a supported processing time for each band or band combination.

Alternatively or additionally, the report of whether the shortened processing time is supported may include information about a maximum number of carriers for which the shortened processing time is supported in each band or band combination.

Alternatively or additionally, if more than the maximum number of carriers are configured or activated for the UE, a processing time for use in the UE may be determined to be a predetermined processing time.

Alternatively or additionally, when two serving cells for cross-carrier scheduling are configured for the UE, if the two serving cells have different processing times, the uplink transmission operation may be performed according to a longer processing time of the processing times of the two serving cells.

Alternatively or additionally, when two serving cells for cross-carrier scheduling are configured for the UE, the two serving cells may have the same processing time.

Alternatively or additionally, the uplink transmission operation may include an operation of transmitting a hybrid automatic repeat request (HARQ) feedback for downlink data reception or an uplink data transmission operation according to reception of an uplink grant.

Alternatively or additionally, the UE may be configured to support two or more processing times.

Alternatively or additionally, if the timings of HARQ feedbacks for downlink data receptions having different processing times overlap with each other, each DL data may be limited to one codeword.

Alternatively or additionally, when the timings of HARQ feedbacks for downlink data receptions having different processing times overlap with each other, if downlink data scheduled by specific downlink control information is two codewords, HARQ feedbacks for the two codewords may be bundled.

Alternatively or additionally, if cells aggregated for the carrier aggregation support a downlink short transmission time interval (TTI), a downlink short TTI may be configured for each cell, each cell group, or each physical uplink control channel (PUCCH) cell group.

Alternatively or additionally, if cells aggregated for the carrier aggregation support an uplink short TTI, an uplink short TTI may be configured for each cell, each cell group, or each physical uplink control channel (PUCCH) cell group.

According to another embodiment of the present disclosure, a UE for supporting carrier aggregation and a shortened processing time in a wireless communication system may include a receiver and a transmitter, and a processor configured to control the receiver and the transmitter. The processor may be configured, if carrier aggregation is configured for the UE, to report to a base station (BS) whether the UE supports the shortened processing time, if cross carrier aggregation is configured for the UE, to determine a processing time to be used for the UE, and to perform an uplink transmission operation according to the determined processing time.

The aforementioned solutions are just a part of embodiments of the present disclosure. Various embodiments to which technical characteristics of the present disclosure are reflected can be drawn and understood based on detail explanation on the present disclosure to be described in the following by those skilled in the corresponding technical field.

Advantageous Effects

According to the embodiments of the present disclosure, uplink transmission may be performed efficiently.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

MODE FOR CARRYING OUT THE INVENTION

Figure 1:
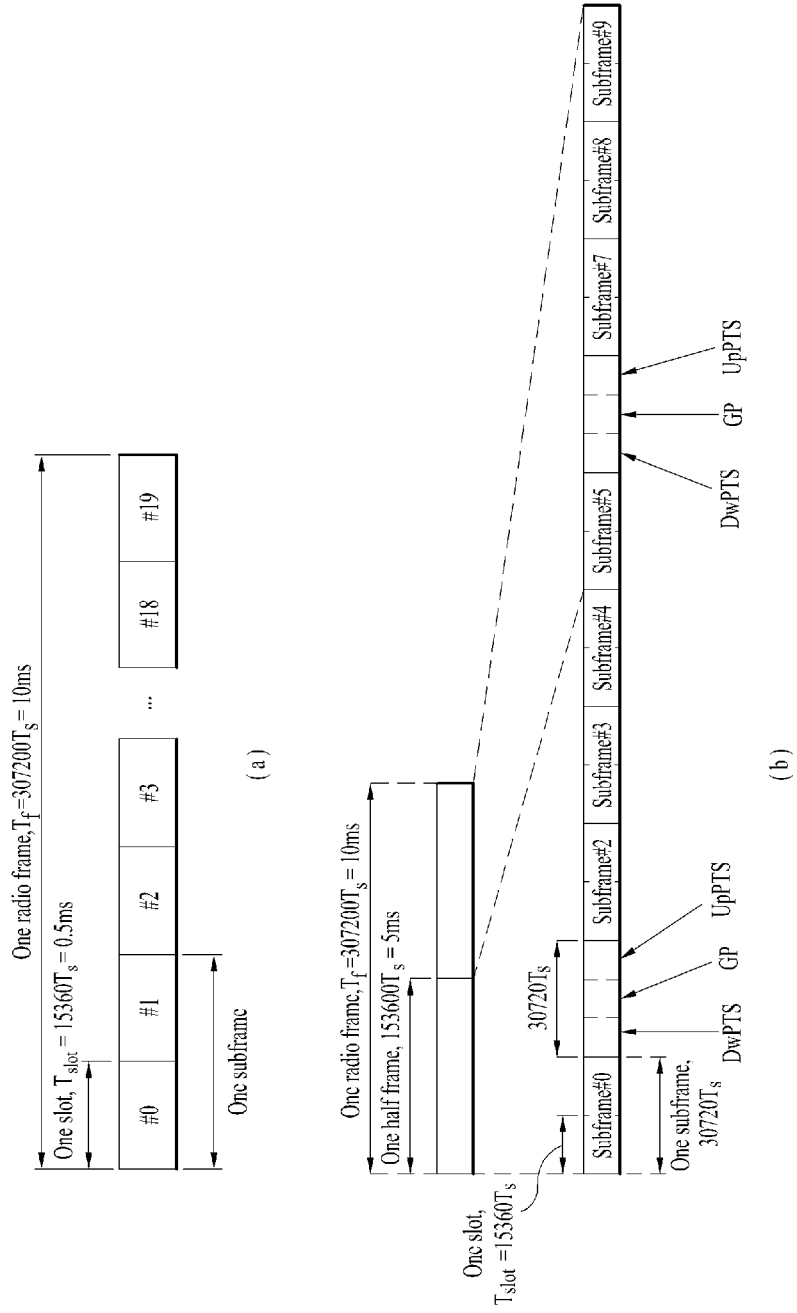
FIG. 1 is a diagram for an example of a radio frame structure used in wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
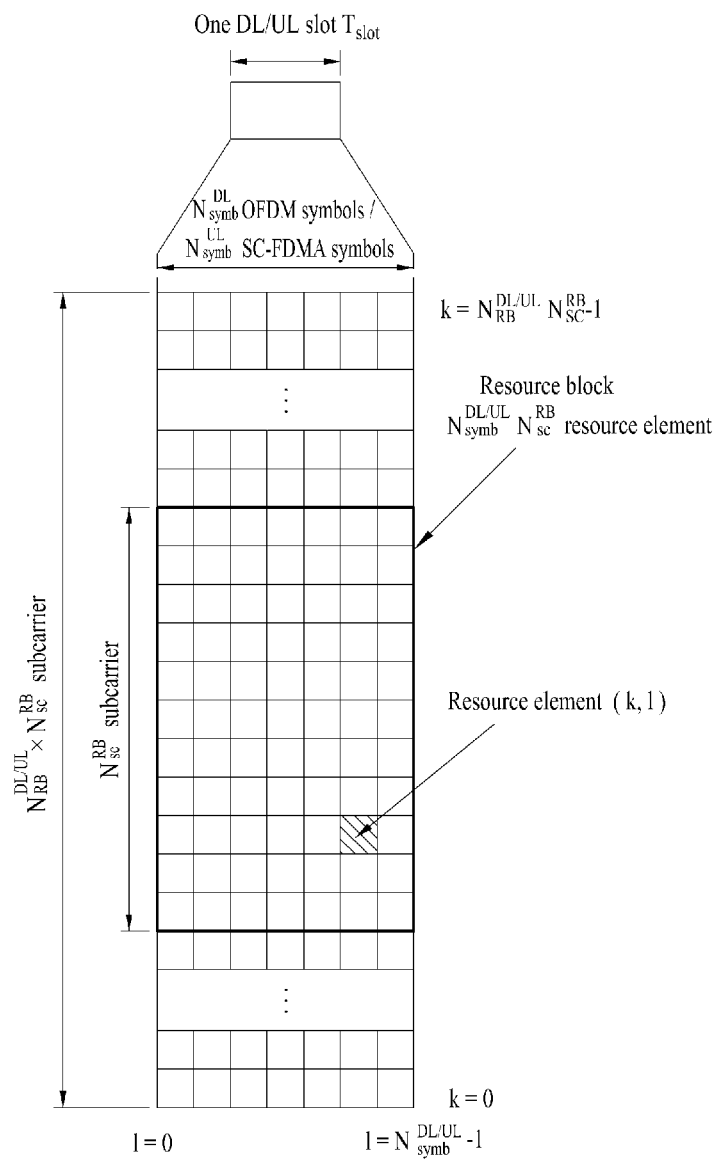
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
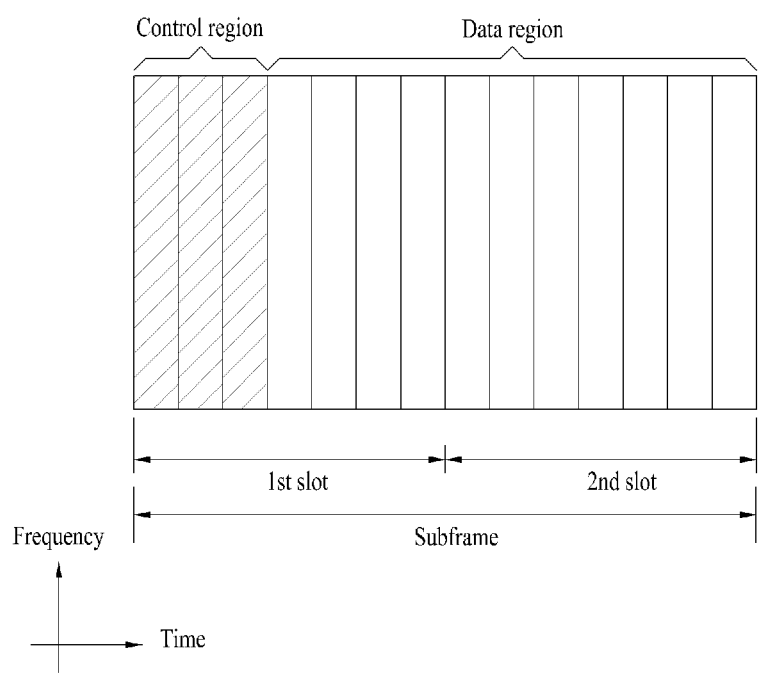
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space Type | Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
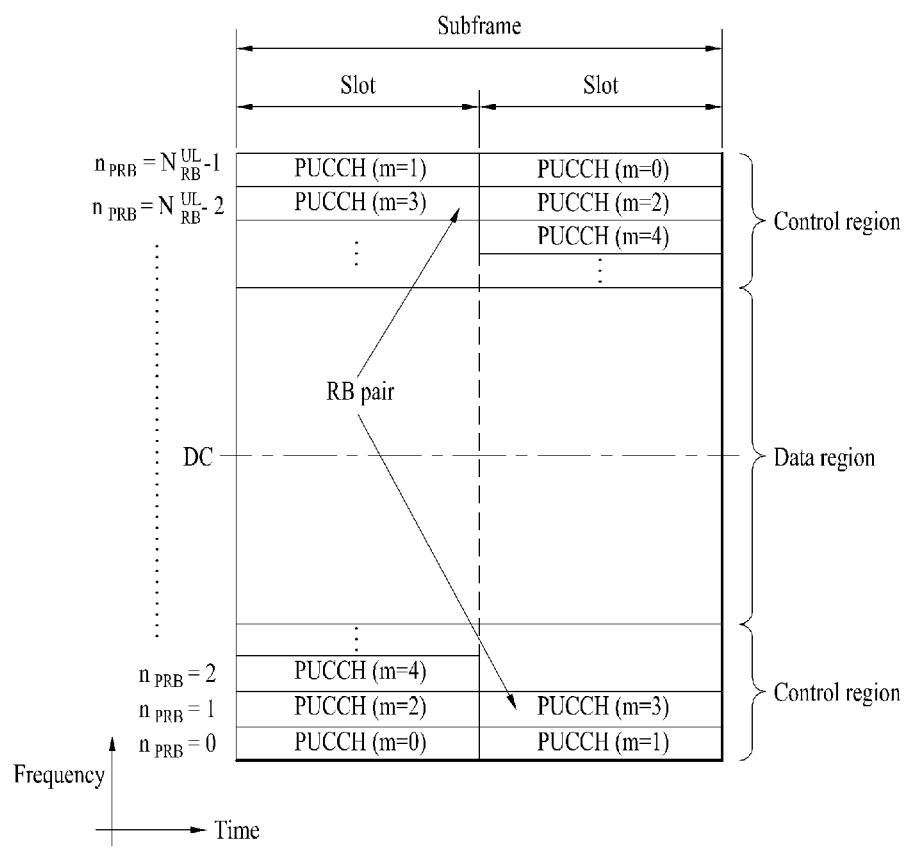
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

In order to satisfy requirements for various application fields, it may be considered to configure various transmission time intervals (TTIs) (or various TTI lengths) for all or a specific physical channel in the next-generation system. More characteristically, a TTI during which a physical channel such as a PDCCH/PDSCH/PUSCH/PUCCH is transmitted may be set to be less than 1 msec to reduce latency for communication between an eNB and a UE according to a scenario (such a PDCCH/PDSCH/PUSCH/PUCCH is referred to as an sPDCCH/sPDSCH/sPUSCH/sPUCCH). For a single UE or multiple UEs, a plurality of physical channels may exist in a single subframe (e.g., 1 msec), and have different TTIs (or TTI lengths). The following embodiments will be described in the context of an LTE system, for the convenience of description. A TTI may be 1 msec (normal TTI), the length of a normal subframe used in the LTE system, and a short TTI is a TTI shorter than the normal TTI, spanning one or more OFDM or SC-FDMA symbols. While a short TTI (i.e., a TTI shorter than a legacy one subframe) is taken for the convenience of description, the key features of the present disclosure may be extended to a TTI longer than one subframe or equal to or longer than 1 ms. Characteristically, the key features of the present disclosure may also be extended to a short TTI which is introduced to the next-generation system by increasing a subcarrier spacing. Although the present disclosure is described in the context of LTE, for convenience, the same thing is applicable to a technology using a different waveform/frame structure such as new radio access technology (RAT). In general, the present disclosure is based on the assumption of an sTTI (<1 msec), a longTTI (=1 msec), and a longerTTI (>1 msec).

Further, with a TTI maintained equal to 1 ms as in the legacy LTE system, a DL-to-UL timing (e.g., a time from DL data transmission to DL HARQ feedback transmission, or a time from UL grant transmission to UL data transmission) may be reduced. This operation may be referred to as a shortened processing time operation.

When a UE operates in carrier aggregation (CA) or dual connectivity (DC), the UE may be configured with a plurality of serving cells, and an assumption or configuration for a shortened processing time and/or a short TTI may be different for each cell. The serving cells may have different TTI lengths, for example, when they have different numerologies such as subcarrier spacings. In the present disclosure, a "shortened processing time" refers to a DL data-to-DL HARQ-ACK timing and/or a UL grant-to-UL data timing, which is different from a legacy processing time.

CA with Shortened Processing Time

It may be regulated that a UE reports whether it supports a shortened processing time operation by capability signaling. In this case, if the UE is configured with a shortened processing time, it may be regulated that the shortened processing time is applied to all carriers. It may be regulated that the UE reports whether the UE supports the shortened processing time operation depending on whether the UE actually performs CA, or the UE reports whether the UE supports the shortened processing time operation for each number of component carriers (CC) (or for each range consisting of a group of CC number) for which CA is actually performed.

It may be regulated that the UE reports whether the UE supports the shortened processing time operation on a per band per band combination basis (on a per band per band-combination basis). According to the present proposal, the UE may report its capability of supporting the shortened processing time operation independently for each CC available for CA, which enables more flexible UE implementation. For example, a UE with low processing power may report that the UE is capable of supporting the shortened processing time operation only for one of two CCs available for CA, while a UE with high processing power may report that the UE is capable of supporting the shortened processing time operation for both of the CCs.

If the shortened processing time operation is supported in a specific band or band combination, a specific capability may also be reported. Specifically, it may be regulated that the UE reports a supported processing time per band or per band combination. For example, the report of the supported processing time may be a report of the shortest of supported processing times or a report of all supported shortened processing times (e.g., when only n+2 and n+3 among n+1, n+2, and n+3 are supported, n+2 and n+3 are reported as supported shortened processing times).

It may be regulated that the UE reports a maximum number of CCs for which the shortened processing time operation may be supported in a specific band, on a per band or per band combination basis. If this signaling is introduced, the UE may report more elaborately whether the UE supports the shortened processing time operation for CCs of intra-band contiguous CA. For example, even when intra-band contiguous CA is performed by using bandwidth class C in band x, it is possible to support the shortened processing time operation only for a part of a plurality of CCs included in band x.

Further, it may be regulated that the UE reports the capability of supporting the shortened processing time operation independently on a CC basis, even for CCs of non-contiguous intra-band CA. Specifically, it may be regulated that information indicating whether the shortened processing time operation is supported on a band or band combination basis and/or information about a supported processing time and/or a maximum number of CCs for which the shortened processing time operation may be supported is configured independently for each intra-band CC.

As the number of CCs aggregated for CA decreases, a CA-enabled UE may have more extra processing power, and support a shortened processing time for more CCs with the extra processing power. Accordingly, it may be regulated that for each number of CCs actually aggregated for CA, a maximum number of CCs for which the shortened processing time operation is supported is reported or pre-defined/pre-agreed.

Alternatively or additionally, it may be regulated if a CA-enabled UE is configured with a shortened processing time operation-related configuration, a CA operation is supported only for a predetermined number of or fewer CCs. It may be regulated that if a CA-enabled UE is configured with a shortened processing time operation-related configuration, one of the CA operation and the shortened processing time operation is disabled.

Alternatively or additionally, it may be regulated that different maximum numbers of CCs supporting the shortened processing time operation when CA is performed, and CCs supporting the shortened processing time operation when CA is not performed are reported independently by a UE, or pre-defined/pre-agreed.

It may be regulated that when it is indicated to a UE whether the shortened processing time operation is supported on a band or CC basis, a maximum transport block (TB) size and/or a maximum timing advance (TA) and/or a maximum number of transmission layers and/or a maximum number of transmission PRBs is limited on a band or CC basis. The restrictions may be pre-agreed or signaled. Particularly, the restrictions may be different independently for each numerology (e.g., each TTI length or subcarrier spacing). Alternatively or additionally, it may be regulated that if the shortened processing time operation is configured for the UE, the UE reports a supported maximum TB size and/or a supported maximum TA and/or a maximum number of transmission layers and/or a maximum number of transmission PRBs on a band or CC basis.

It may be regulated that if a specific CC is configured or activated for a UE, for the specific CC, the UE follows a processing time configured for a PCell without performing an additional (re)configuration process for a processing time. Alternatively or additionally, it may be regulated that the UE follows the maximum (or minimum) of processing times configured for the UE, for a corresponding CC.

A plurality of processing times may be configured for a specific UE. Hereinbelow, a first processing time may be a timing which is not related to a shortened processing time configuration. In FDD, the first processing time may be a timing or time taken for transmitting a DL HARQ feedback or UL data in subframe (SF) #n+4 or TTI #n+4 in response to DL data or a UL grant transmitted in SF #n or TTI #n. In TDD, the first processing time, which is basically at least 4 ms, may become longer than 4 ms according to actual DL/UL subframes. A second processing time may be a new timing which is introduced according to a shortened processing time configuration. For example, the second processing time may be is a timing or a time taken for transmitting a DL HARQ feedback or UL data in SF #n+3 or TTI #n+3 in response to DL data or a UL grant transmitted in SF #n or TTI #n. In TDD, the second processing time, which is basically at least 3 ms, may become longer than 3 ms according to actual DL/UL subframes. For a single cell, the first processing time may be used for a fallback operation (e.g., for PDSCH/PUSCH scheduling by common search space (CS S) DCI and/or PDSCH scheduling by DCI format 1A, or for using a general RNTI), whereas the second processing time may be used for applying a shortened processing time (e.g., for PDSCH/PUSCH scheduling by user-specific search space (USS) DCI and/or PDSCH scheduling by TM-dependent DCI, or for using a third RNTI). A different configuration for a shortened processing time operation may be used for each cell in CA or DC. Alternatively or additionally, different processing times may be configured for a plurality of TTIs with different lengths.

If the timing of an HARQ-ACK feedback for a DL grant to which the first processing time is applied overlaps wholly (or partially) with the timing of an HARQ-ACK feedback for a DL grant to which the second processing time is applied, it may be regulated that the number of codewords of a PDSCH scheduled by each of the DL grants is limited to 1. Characteristically, it may be regulated that the number of codewords of a PDSCH scheduled by USS DCI or TM-dependent DCI is limited to 1 in the above case. For example, if the transmission timing of an HARQ-ACK feedback for a PDSCH scheduled in SF #n−4 by CSS DCI to which a legacy processing time is applied, and the transmission timing of an HARQ-ACK feedback for a PDSCH scheduled in SF #n−3 by USS DCI to which a shortened processing time is applied are SF #n, it may be regulated that the number of codewords of the PDSCH scheduled by the USS DCI is limited to 1 such that the total number of HARQ-ACK bits is 2. Alternatively or additionally, it may be regulated that if there are two codewords of the PDSCH scheduled by the USS DCI or TM-dependent DCI, HARQ-ACK feedbacks are (spatially) bundled. The foregoing rules may be restrictively applied only to a UE for which a specific PUCCH format (e.g., PUCCH format 3/4/5) is not configured. If the transmission timings of HARQ-ACK feedbacks for a predetermined number of or more codewords are wholly (or partially) overlapped as in the above case, it may be regulated that the number of codewords of an SCell is first limited to 1 or HARQ-ACK feedbacks for the codewords of the SCell are first (spatially) bundled.

In more general terms, it may be regulated in the above proposal that if the transmission timings of HARQ-ACK feedbacks for DL grants to which a plurality of different processing times are applied are wholly (or partially) overlapped, the number of codewords of a PDSCH scheduled by each of the DL grants is limited to 1. Characteristically, it may be regulated that the number of codewords is limited to 1 for a PDSCH scheduled by USS DCI or TM-dependent DCI. Alternatively or additionally, if there are two codewords of the PDSCH scheduled by the USS DCI or TM-dependent DCI, HARQ-ACK feedbacks are (spatially) bundled.

In the case where a UE performs an operation such as "reporting whether it may support a shortened processing time operation for each number of CCs actually aggregated for CA (or for each range including a group of numbers of CCs)", "reporting a maximum number of CCs supporting the shortened processing time operation, for each number of CCs actually aggregated for CA", or "independently reporting different maximum numbers of CCs supporting the shortened processing time operation when CA is performed and CCs supporting the shortened processing time operation when CA is not performed", or in the case where the UE similarly reports its capability related to CA and the shortened processing time operation, if more than carriers for which the UE is capable of supporting the shortened processing time operation are configured/activated for the UE, it may be regulated that the UE follows a legacy processing time for all configured/activated carriers. Alternatively or additionally, if more than carriers for which the UE is capable of supporting a shortened processing time are configured/activated for the UE in the above situation, it may be regulated that the UE follows a pre-defined or signaled specific processing time for all configured/activated carriers.

In cross-carrier scheduling (CCS), it may be regulated that the processing time of a scheduled cell is based on a processing time configured for a scheduling cell at the time of scheduling. Alternatively or additionally, it may be regulated that the processing time of the scheduled cell is based on a specific processing time signaled by a higher-layer/physical-layer signal or implicitly indicated.

In CA or DC, if different processing times are configured for a scheduling cell, a scheduled cell, and an HARQ transmitting cell (e.g., PCell, PSCell, or a specific cell indicated/configured for transmitting an HARQ feedback), an actual DL assignment-to-DL data and/or UL grant-to-UL data processing time may be determined as follows. Characteristically, the following rules may be applied for determining a processing time in the case of CCS.

- Alt 1: An actual processing time may be determined according to a processing time configured for a scheduled cell. Characteristically, the rule may be applied for determining a UL grant-to-UL data and/or DL assignment-to-DL data timing.
- Alt 2: The actual processing time may be determined to be the longer between a processing time configured for the scheduled cell and a processing time configured for an HARQ transmitting cell. For example, if processing times n+3 and n+4 are configured respectively for the scheduled cell and the HARQ transmitting cell, it may be regulated that a DL data-to-DL HARQ transmission timing is n+4. That is, it may be regulated that for operation with a shorter processing time (e.g., n+3), both of the scheduled cell and the HARQ transmitting cell are configured at least with the shorter processing time. Likewise, the actual processing time may be determined to be the longer between a processing time configured for the scheduling cell and a processing time configured for the scheduled cell.
- Alt 3: It may be regulated that CCS is allowed only when the same processing time is configured for the scheduling cell and the scheduled cell. Similarly, it may be regulated that the same processing time configuration is always applied to the scheduled cell and the HARQ transmitting cell. For example, if a shortened processing time is not configured for the HARQ transmitting cell, only a cell for which a shortened processing time is not configured may be allowed as a scheduled cell.

Configuration of TTI Length/CA/Processing Time

If a UE is configured with an sTTI operation, the same or different DL sTTI lengths may be configured for cells. Characteristically, a different DL sTTI length may be configured for each cell group or each PUCCH cell group. Alternatively or alternatively, a different DL sTTI length may be configured for each TA group.

UL sTTI Length

If a UE is configured with an sTTI operation, the same or different UL sTTI lengths may be configured for cells. Characteristically, a different UL sTTI length may be configured for each cell group or PUCCH cell group. Alternatively or additionally, a different UL sTTI length may be configured for each TA group. Alternatively or additionally, for a UE configured with an sTTI operation, only a single TA group may be configured for each cell group or PUCCH group.

Characteristically, the DL/UL TTI length configuration may be implemented by a higher-layer or physical-layer signal.

More generally, if a UE is (additionally) configured with a numerology different from a default numerology (hereinafter, referred to as a "different/additional numerology operation"), a different DL or UL numerology may be configured for each cell group, PUCCH group, or TA group. The DL/UL numerology configuration may be implemented by a higher-layer or physical-layer signal.

Processing Time Configuration

A processing time may be separately configured for each cell group, PUCCH group, or TA group. Characteristically, even for the same (DL and/or UL) sTTI length, a (different) processing time may be configured separately for each cell group, PUCCH group, or TA group. The processing time may include a DL data-to-DL HARQ-ACK timing and/or UL grant-to-UL data timing, and the two timings may be configured differently for each cell group, PUCCH group, or TA group, (independently) for the same (DL and/or UL) sTTI length.

Configuration of Shorted Processing Time and sTTI

A UE may be configured with a shortened processing time operation and/or an sTTI operation. Characteristically, the following configurations are available.

The UE may independently derive and report the capability of a shortened processing time operation and the capability of an sTTI operation (more generally, a different/additional numerology operation). That is, the UE may separately report, to the network, the capability of the shortened processing time operation supported by the UE in a situation in which the sTTI operation (or different/additional numerology operation) is not supported, and/or the capability of the sTTI operation (or different/additional numerology operation) supported by the UE in a situation in which the shortened processing time operation is not supported. The capability signaling may be transmitted on a band combination basis. The UE may not expect that the shortened processing time operation and the sTTI operation (or different/additional numerology operation) will be configured simultaneously.

Alternatively or additionally, the UE may report the joint capability of the shortened processing time operation and the sTTI operation (or different/additional numerology operation). Alternatively or additionally, the UE may report the joint capability of the sTTI operation for different short TTI lengths (or different numerologies). The capability signaling may be transmitted on a band combination basis. For example, the UE may report by separate capability signaling whether the UE simultaneously supports a 7-symbol TTI operation and the shortened processing time operation, whether the UE simultaneously supports a 2-symbol TTI operation and the shortened processing time operation, and whether the UE simultaneously supports the 2-symbol TTI operation and the 7-symbol TTI operation.

Alternatively or additionally, if the UE is configured with the sTTI operation (or different/additional numerology operation), it may be regulated that CA is enabled only in a band combination in which the sTTI operation (or different/additional numerology operation) is supported.

Similarly, if the UE is configured with the shortened processing time operation, it may be regulated that CA is enabled only in a band combination in which the shortened processing time operation is supported.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB.

Figure 5:
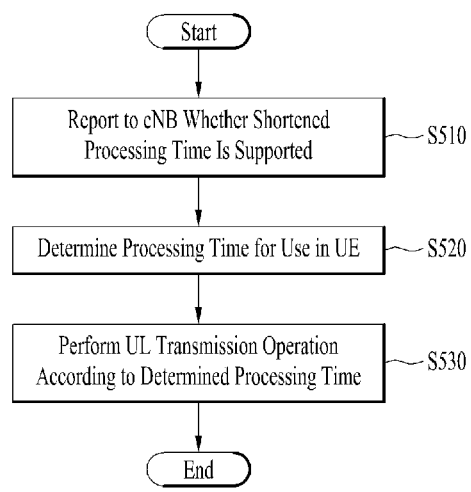
FIG. 5 illustrates an operation of a user equipment (UE) according to an embodiment of the present disclosure.

FIG. 5 illustrates an operation according to an embodiment of the present disclosure.

FIG. 5 depicts a method of supporting CA and a shortened processing time in a wireless communication system. The method may be performed by a UE. When the UE is configured with CA, the UE may report whether the UE is capable of supporting a shortened processing time to an eNB (S510). When the UE is configured with CCS, the UE may determine a processing time for use in the UE (S520). The UE may perform a UL transmission operation according to the determined processing time (S530).

The report as to whether the shortened processing time is supported may include information indicating whether the shortened processing time is supported for each number of carriers used for CA or for each group of numbers of carriers used for CA. Further, the report as to whether the shortened processing time is supported may be provided on a band basis or on a band combination basis. Further, the report as to whether the shortened processing time is supported may include information about a supported processing time in each band or band combination. Further, the report as to whether the shortened processing time is supported may include information about a maximum number of carriers for which the shortened processing time is supported in each band or band combination.

If more than the maximum number of carriers are configured or activated for the UE, a processing time for use in the UE may be determined to be a predetermined processing time.

In the case where two serving cells for CCS are configured for the UE, if the two serving cells have different processing times, the UE may perform the UL transmission operation according to the longer between the processing times of the two serving cells.

In the case where two serving cells for CCS are configured for the UE, the two serving cells may have the same processing time.

The UL transmission operation may include an operation of transmitting an HARQ feedback for DL data reception or a UL data transmission operation according to reception of a UL grant. Further, the UE may be configured to support two or more processing times. If the timings of HARQ feedbacks for DL data receptions having different processing times overlap with each other, each DL data may be limited to one codeword. Alternatively or additionally, in the case where the timings of HARQ feedbacks for DL data receptions having different processing times overlap with each other, if DL data scheduled by specific DCI is two codewords, HARQ feedbacks for the two codewords may be bundled.

If the cells aggregated for CA support a DL sTTI, a DL sTTI may be configured for each cell, each cell group, or each PUCCH cell group. Further, if the cells aggregated for CA support a UL sTTI, a UL sTTI may be configured for each cell, each cell group, or each PUCCH cell group.

Figure 6:
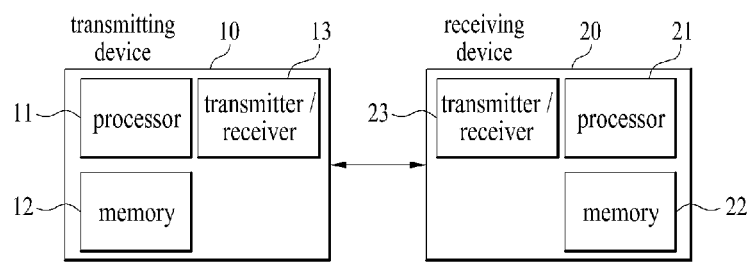
FIG. 6 is a block diagram for a device configured to implement embodiment(s) of the present disclosure.

FIG. 6 is a block diagram of a transmitting device 10 and a receiving device 20 configured to implement exemplary embodiments of the present disclosure. Referring to FIG. 6, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on uplink and as the receiving device 20 on downlink. In embodiments of the present disclosure, an eNB serves as the receiving device 20 on uplink and as the transmission device 10 on downlink.

The transmitting device and/or the receiving device may be configured as a combination of one or more embodiments of the present disclosure.

The detailed description of the exemplary embodiments of the present disclosure has been given to enable those skilled in the art to implement and practice the disclosure. Although the disclosure has been described with reference to the exemplary embodiments, those skilled in the art will appreciate that various modifications and variations can be made in the present disclosure without departing from the spirit or scope of the disclosure described in the appended claims. For example, those skilled in the art may use each construction described in the above embodiments in combination with each other. Accordingly, the disclosure should not be limited to the specific embodiments described herein, but should be accorded the broadest scope consistent with the principles and novel features disclosed herein.

INDUSTRIAL APPLICABILITY

The present disclosure may be used for a wireless communication apparatus such as a user equipment (UE), a relay and an eNB.

The invention claimed is:

1. A method for performing a communication by a user equipment (UE) supporting a shortened processing time in a wireless communication system, the method comprising:
    reporting, to a base station (BS), capability information, wherein the capability information comprises (i) information indicating whether the UE supports the shortened processing time, (ii) information indicating a maximum number of carriers for which the shortened processing time is supported, and (iii) information indicating whether the UE supports a short transmission time interval (TTI) which is less than 1 msec in duration;
    based on that the UE supports the short TTI, receiving, through a higher layer signal, configuration information indicating a length of a downlink short TTI and a length of an uplink short TTI for cells of at least one physical uplink control channel (PUCCH) cell group; and
    performing the communication with the BS based on the short TTI,
    wherein the capability information is reported per band combination, and
    wherein the length of the downlink short TTI is configured to be the same and the length of the uplink short TTI is configured to be same for cells of a PUCCH cell group, and
    wherein the length of the downlink short TTI is configured to be different and the length of the uplink short TTI is configured to be different only for cells of different PUCCH cell groups.

2. The method of claim 1, wherein based on that more than the maximum number of carriers are configured or activated for the UE, a processing time for use in the UE is configured to be a predetermined processing time.

3. The method of claim 1, wherein based on that two serving cells for cross-carrier scheduling are configured for the UE, and the two serving cells have different processing times, the communication is performed according to a longer processing time of the processing times of the two serving cells.

4. The method of claim 1, wherein based on that two serving cells for cross-carrier scheduling are configured for the UE, the two serving cells have the same processing time.

5. The method of claim 1, wherein the communication includes an operation of transmitting a hybrid automatic repeat request (HARQ) feedback for downlink data reception or an uplink data transmission operation according to reception of an uplink grant.

6. The method of claim 1, wherein the UE is configured to support two or more processing times.

7. The method according to claim 6, wherein based on that the timings of HARQ feedbacks for downlink data receptions having different processing times overlap with each other, each DL data is limited to one codeword.

8. The method according to claim 6, wherein based on that the timings of HARQ feedbacks for downlink data receptions having different processing times overlap with each other, if downlink data scheduled by specific downlink control information is two codewords, HARQ feedbacks for the two codewords are bundled.

9. A user equipment (UE) configured to support carrier aggregation and a shortened processing time in a wireless communication system, the UE comprising:
    a receiver and a transmitter;
    at least one processor; and
    at least one computer memory operably connectable to the at least one processor and storing instructions that, when executed by the at least one processor, performed operations comprising:
        reporting, to a base station (BS), capability information, wherein the capability information comprises (i) information indicating whether the UE supports the shortened processing time, (ii) information indicating maximum number of carriers for which the shortened processing time is supported, and (iii) information indicating whether the UE supports a short transmission time interval (TTI) which is less than 1 msec in duration,
        based on that the UE supports the short TTI, receiving, through higher layer signal, configuration information indicating a length of a downlink short TTI and a length of an uplink short TTI for cells of at least one physical uplink control channel (PUCCH) cell group, and performing a communication with the BS based on the short TTI, wherein the capability information is reported per band combination, and wherein the length of the downlink short TTI is configured to be the same and the length of the uplink short TTI is configured to be same for cells of a PUCCH cell group, and wherein the length of the downlink short TTI is configured to be different and the length of the uplink short TTI is configured to be different only for cells of different PUCCH cell groups.

* * * * *